S. B. JACKSON.
FASTENER.
APPLICATION FILED SEPT. 21, 1915.

1,251,380.

Patented Dec. 25, 1917.

INVENTOR
Samuel Beaumont Jackson
BY
Roberts, Roberts & Cushman
ATTORNEY

UNITED STATES PATENT OFFICE.

SAMUEL BEAUMONT JACKSON, OF QUINCY, MASSACHUSETTS.

FASTENER.

1,251,380.  Specification of Letters Patent.  Patented Dec. 25, 1917.

Application filed September 21, 1915. Serial No. 51,861.

*To all whom it may concern:*

Be it known that I, SAMUEL BEAUMONT JACKSON, a citizen of the United States, and resident of Quincy, in the county of Norfolk and State of Massachusetts, have invented new and useful Improvements in Fasteners, of which the following is a specification.

This invention relates to separable fasteners, and while susceptible of general use is particularly intended for use in automobiles and other vehicles to fasten curtains, flaps, etc.

The fastener is of the kind which comprises two separable members capable of being positively interlocked as distinguished from snap fasteners, and also capable of being readily unlocked for the purpose of separation.

In the accompanying drawings which illustrate the invention,—

Figure 1:
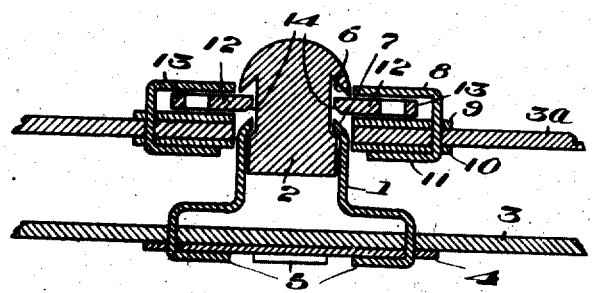
Figure 1 is a sectional view of the fastener with the stud member and the socket member interlocked.

The stud member comprises a hollow post 1 in which is a shank 2 held loosely to slide endwise in the hollow post. The stud member is secured to the fabric or other base 3 by means of a washer 4 provided with slots through which prongs or tongues 5 on the post member project, first passing through the fabric 3 and then being clenched underneath the washer 4.

The outer end of the hollow post 1 is provided with a flange or lip to engage a corresponding enlargement or shoulder on the shank 2, thereby preventing the shank from being withdrawn from the post. The outer end of the shank 2 is made with an undercut shoulder 6 which coöperates with the tapered or beveled outer end 7 of the post to form a comparatively smooth exterior surface between the shank 2 and the post 1, when said parts are contracted, as shown in Fig. 2.

The socket member comprises the housing 8 made with a central circular opening through which the stud member passes. A chamber is formed in the socket member for the locking jaws presently to be described by means of the partition or disk 9. The socket member is secured to the fabric 3ª or other thing which is to be fastened to the base 3 by means of a washer 10 slotted to receive tongues 11 which project from the housing 8 through the fabric and washer and are clenched underneath the latter.

Figure 3:
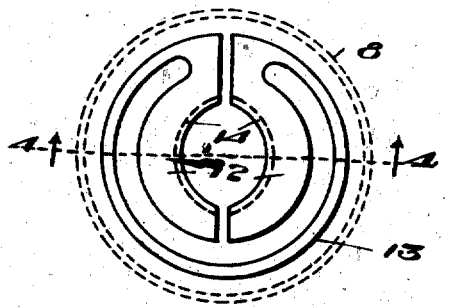
Fig. 3 is a plan view of the spring lock used in the socket member.
Figure 4:
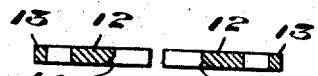
Fig. 4 is a section on line 4—4 of Fig. 3.

The spring lock by which the socket member and stud member are positively fastened together consists of the two locking jaws 12 which are formed integrally of the same punching of flat sheet metal with a resilient divided hoop 13 which is connected at its free ends with adjacent ends of the jaws 12 and which encircles the jaws, as best shown in Fig. 3. The jaws 12 are relatively broad as compared with the hoop 13 and are flat on their upper or outer side so as to make a positive locking engagement with the abrupt shoulder 6 of the shank 2 when the parts are in locked position, as shown in Fig. 1. The jaws 12 are beveled on their under side, as shown at 14, to facilitate the spreading or yielding of the jaws when the members are being united, whereby the lock will spread and pass over the head of the shank 2 and the beveled outer end 7 of the hollow post 1.

Figure 2:
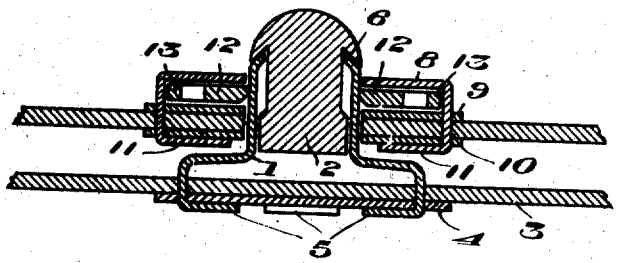
Fig. 2 is a similar view of the fastener with the two members unlocked preparatory either to uniting or separating the same.

When the members are to be united the central opening of the socket member is passed over the end of the stud member, the shank 2 being in contracted position, as shown in Fig. 2, whereupon the jaws 12 engaging the rounded end of the shank 2 will yield and spread and the socket member will be brought into the position shown in Fig. 2 with the jaws engaging the sides of the post 1. If now the socket member is lifted, the flat outer surface of the jaws 12 will engage the abrupt shoulder 6 of the shank, moving the same endwise and permitting the jaws 12 to snap under the shoulder 6, as shown in Fig. 1, where the abrupt shoulder 6 and the flat upper surface of the jaws 12 will form a positive lock which cannot be separated by any outward strain lengthwise of the stud member.

In order to disunite the socket member from the stud member, the shank 2 is pressed inwardly which will cause the beveled under surfaces 14 of the jaws 12 to engage the tapered end 7 of the hollow post and to spread the jaw members and force them down into engagement with the sides of the post, as shown in Fig. 2. Thereupon by holding the shank 2 in contracted position, as shown in Fig. 2, with the jaw members 12 spread apart, the socket member may be readily slipped off from the stud member.

I claim:—

1. A separable fastener, comprising a stud member consisting of a hollow post having its outer end tapered and a shank movable endwise in said hollow post having a head provided with an undercut shoulder to correspond with the tapered end of the post, a socket member having an opening to receive the stud member, and a spring lock in the socket member comprising a pair of locking jaws connected and encircled by a resilient, divided hoop, said jaws and hoop being integrally formed of the same material, said jaws being flat on the outer side to engage said shoulder and positively to lock the fastener member against separation, and beveled on the under side to cause the jaws to yield when the socket member is passed over the head of the stud member or the tapered end of the hollow post.

2. A separable fastener comprising a socket member, a button member having a shank reciprocatably mounted in the socket member, the outer portion of the shank being of smaller diameter than the inner portion of the shank and the outer end of the socket member having an internal flange surrounding said smaller portion and overhanging the larger portion so that the button member cannot be outwardly withdrawn from the socket member, a head on the outer end of said shank, a fastening member having an opening to receive the button member, retaining members mounted on the fastening member on opposite sides of said opening to engage the said head and prevent the withdrawal of the button member from the opening, means for yieldingly holding said retaining members in engaging position, said retaining members being beveled on their lower edges, and said internal flange having a sloping outer surface adapted to engage said beveled edges when the socket member is pushed forwardly over the said shank thereby to force said retaining members apart so that the said button member may be withdrawn from the said fastening member.

3. A separable fastener comprising a socket member, a button member having a shank reciprocatably mounted in the socket member, the outer portion of the shank being of smaller diameter than the inner portion of the shank and the outer end of the socket member having an internal flange surrounding said smaller portion and overhanging the larger portion so that the button member cannot be outwardly withdrawn from the socket member, a head on the outer end of said shank, a fastening member having an opening to receive the button member, retaining members mounted on the fastening member on opposite sides of said opening to engage the said head and prevent the withdrawal of the button member from the opening, means for yieldingly holding said retaining members in engaging position, said retaining members being flat on their upper sides so as positively to prevent the withdrawal of said head when they are in engaging position and being beveled on their lower edges, and said internal flange having a sloping outer surface adapted to engage said beveled edges when the socket member is pushed forwardly over the said shank thereby to force said retaining members apart so that the said button member may be withdrawn from the said fastening member.

Signed by me at Boston, Massachusetts, this 20th day of September, 1915.

SAMUEL BEAUMONT JACKSON.

Witnesses:
ROBERT CUSHMAN,
CHARLES D. WOODBERRY.